United States Patent [19]
Parker

[11] Patent Number: 5,930,427
[45] Date of Patent: Jul. 27, 1999

[54] FIBER OPTICS CONNECTOR

[75] Inventor: Douglas Parker, Camarillo, Calif.

[73] Assignee: G & H Technology, Inc., Camarillo, Calif.

[21] Appl. No.: 09/008,504

[22] Filed: Jan. 20, 1998

[51] Int. Cl.[6] .................................... G02B 6/38
[52] U.S. Cl. .............................. 385/60; 385/78
[58] Field of Search .................... 385/58, 60, 66, 385/72, 78, 84, 92

[56] References Cited

U.S. PATENT DOCUMENTS 4,220,394  9/1980  Tardy ........................... 385/55
5,838,857  11/1998  Niekrasz ....................... 385/58

*Primary Examiner*—Rodney Bovernick
*Assistant Examiner*—Robert E. Wise
*Attorney, Agent, or Firm*—George J. Netter

[57] ABSTRACT

An optical fiber socket terminus (28) has a fiber tip (30) received within a tip holder (32) that is welded (41) to a socket tube (36) slidingly received within a socket shoulder (44). A coil spring (38) extends about socket tube (36) between tip holder (32) and shoulder 44. Stop 49 is welded to end portion of tube (36) providing limit to shoulder (44) movement. Pin terminus (10) has a fiber tip (18) that is received within alignment bushing (60) along with the socket tip (30) to achieve proper end relation of the optical fibers.

8 Claims, 2 Drawing Sheets

FIBER OPTICS CONNECTOR

BACKGROUND

1. Background of the Invention

The present invention relates generally to a connector for fiber optics and, more particularly, to a connector of improved strength and reliability in reducing the possibility of damaging external apparatus on mounting the connector to the other apparatus while at the same time preventing external foreign particle contamination to the connector parts.

2. Description of Related Art

The mating of a pair of optical fibers in satisfactory relation so as to transmit an optical signal therebetween without undue diminution or distortion of the signal is an activity which is associated with a number of difficult problems. First of all, the optical fibers are typically of a very small diameter (e.g., 0.005 of an inch) making their handling and mounting in a required relationship difficult. The usual approach has been to face off the ends of the fibers to be mated and arrange them in a slightly end spaced relation with their longitudinal axes precisely aligned. This arrangement is important in that even a slight misalignment can result in substantial reduction in signal value exchanged at the termination junction for the two fibers. Moreover, as a result of the relative small size and mass of connector parts, as well as the fiber itself, on separation and mating of the fibers, one or both fibers can have their spacing and alignment shifted within holding parts to the extent that substantial error is created as the optical signal crosses the terminal interface.

Although spaced end faces of mated fibers is still relied upon when the system may be subject to substantial vibration and shock, many fiber optical connectors are P.C. (i.e., in physical contact) with slightly convex end faces which are highly polished.

A generally accepted overall construction is to provide a pair of termini (frequently referred to as pin and socket termini) which are mechanically mated to one another in order to produce the desired optical interface at the facing fiber ends. Also, in order to insure that the proper connective relationship is maintained, a spring-loaded feature is incorporated into, say, the socket which on passing through one or more grommet seals can result in damage by snagging the seals on any sharp features such as the outer edges of a spring, for example. This aspect is of special concern in space station environments where the ability to repair and replace units obviously can be very expensive and difficult, if not impossible to achieve. Moreover, debris from a damaged grommet, for example, could find its way to the fiber interface degrading an optical signal to an unacceptable degree.

SUMMARY OF THE INVENTION

The optical fiber termination apparatus of the present invention consists of a socket terminus and a pin terminus which are slidingly assembled to one another via an alignment bushing so as to locate two optical fibers to be mated with their facing ends in either slightly spaced or P.C. aligned relationship. Each of the fibers to be appropriately mated are received within an elongated opening extending through separate cylindrical ceramic tips or bodies. In the socket terminus, the tip is slidingly received within a hollow tubular metal tip holder and the tip is secured therein either by epoxy or by initially heating the sleeve so that upon cooling there is an automatic clenching of the holder about the tip. An elongated hollow metal socket tube is so dimensioned as to be fittingly received within the end of the tip holder to which it is affixed preferably by welding. The socket tube passes through a coil spring having one end which resiliently contacts the outer end of the tip holder and the opposite spring end abuts against a generally cylindrical socket shoulder slidingly received upon the socket tube. A tubular stop member is received on the socket tube and welded thereto at a position slightly spaced from the end of the socket shoulder thereby providing room for resilient movement of the fiber tip via the spring with respect to the socket tube. A cylindrical shroud extends protectively about the spring.

In assembly of the socket, an optical fiber including a cable sleeve is received over the outer end of the stop member and the optical fiber itself is threaded through the socket tube and located within the central opening of the fiber tip.

With respect to the pin terminus, an optical fiber tip, which can be constructed generally in the same manner as that used for the socket, is received within the bore of a generally cylindrical pin shoulder. The pin shoulder includes an enlarged flange or head and a cylindrical portion that extends away from the head for receipt within an optical fiber cable sleeve. On assembly of pin and socket, the socket fiber tip and the pin fiber tip are received in opposite ends of a hollow, generally cylindrical alignment bushing having a slotted opening extending completely along one wall. The bushing central opening is generally cylindrical and precisely arranged along a straight line in order to bring the two fiber tips into precise alignment with one another and at an appropriate end-related condition.

BRIEF DESCRIPTION OF THE DRAWING

The detailed description of a preferred embodiment of the invention given herein can be more fully understood by reference to the accompanying drawing in which.

DESCRIPTION OF A PREFERRED EMBODIMENT

Figure 1:
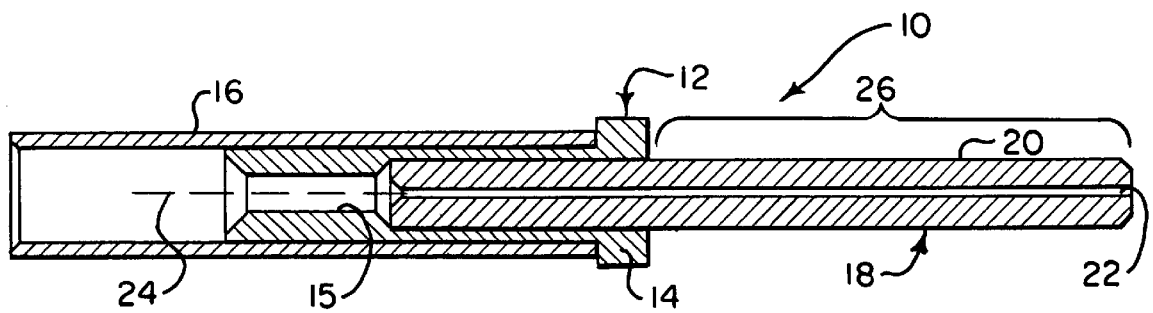
FIG. 1 is a side elevational, partially sectional view of a pin optical fiber terminus of the present invention.

Turning now to the drawing and especially FIG. 1 there is shown a pin terminus 10 of the present invention which includes a generally cylindrical shoulder 12 having an enlarged head 14, which shoulder includes a reduced diameter portion 15 dimensioned so as to slidingly fit within the cable sleeve 16 of an optical fiber. A fiber tip 18 includes a cylindrical body member 20 having a longitudinal extending opening 22 dimensioned to receive the glass or plastic fiber 24 (merely shown schematically) therethrough and to be faced off at the outer end of the tip. The fiber tip may be made of a suitable rigid material (e.g., metal), but is preferably constructed of a ceramic material such as zirconia or aluminum oxide (Al O$_2$). It is to be noted that when the fiber tip is fully received within the bore of the shoulder that a portion of the tip enumerated as 26 extends outwardly of the shoulder.

Figure 2:
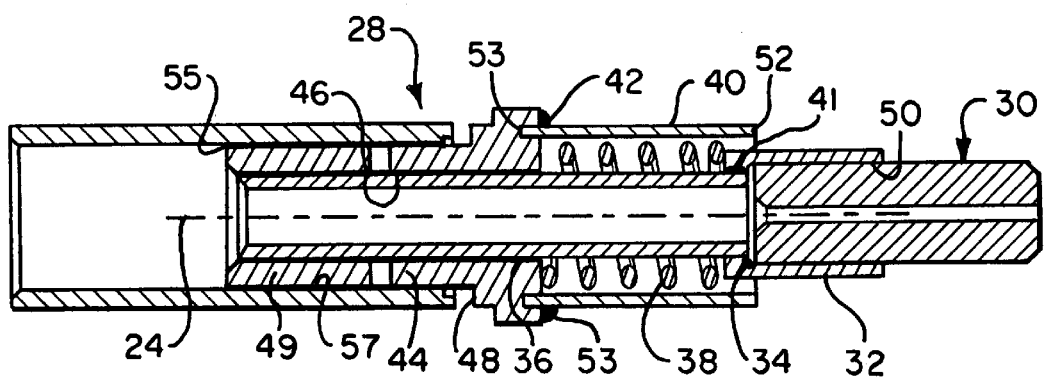
FIG. 2 is a side elevational, sectional view of a socket optical fiber terminus of this invention for mating with the pin terminus of FIG. 1.

For the ensuing details of the socket terminus 28 construction reference is now made particularly to FIG. 2. A fiber tip 30 which can be identical in construction to the fiber tip 18 except modified in length as will be described later, has an end portion received within a cylindrical metal tip holder 32. More particularly, the tip holder 32 is generally cylindrical and hollow throughout with an internal shoulder 34 against which an end of the fiber tip abuts during assembly. A hollow cylindrical metal socket tube 36 has one end slidingly received into the opening of the tip holder 32 just beyond the shoulder 34 and extending generally in alignment with the fiber tip 30. A compression coil spring 38 has an internal longitudinal opening of sufficient diameter so that it may be slidingly received onto the socket tube 36 and has one end which abuts against the outer end of the tip holder 32.

A hollow metal cylindrical tube or spring shroud 40 has one end which is received within a slotted circular opening 42 in an end face of a cylindrical metal socket shoulder 44 so as to extend in alignment with the shoulder bore 46. An opposite side of the shoulder 44 from that to which the shroud is connected is turned down to provide a flange portion 48 facing directly away from the direction that the shroud 40 extends. The internal opening of the socket shoulder 44 is of such dimensions as to permit a sliding fit onto the socket tube 36 positioning the shroud in covering relation over the spring 38. A further internal cylindrical tubular member 49 which serves as an internal sleeve stop is dimensioned so as to permit sliding receipt onto the socket tube 36.

In assembly of the socket terminus, various of the parts are fixedly secured (e.g., welded) to one another as will be described in order to provide a unit which is unitary but also has resiliency for movement of the fiber tip 30 and included fiber in a longitudinal direction. First of all, the fiber tip 30 is secured within the tip holder 32 in either of two different ways, namely, by providing a quantity of epoxy 50 for adhesively securing the optical fiber and tip together or, alternatively, heating the tip holder 32 prior to the time of assembly such that when the fiber tip is received within the tip holder, the tip holder on cooling has a reduced cross section which results in clamping engagement of the fiber tip therein. The tip holder 32 is then welded to socket tube 36 at 41. Also, the shroud 40 end portion that is received within the slotted opening 42 of the shoulder 44 is welded in place at 53 preferably by using laser welding apparatus (not shown). Still further, the sleeve stop 49 is similarly laser welded onto the socket tube 36 at one portion 55 adjacent an outer end thereof and at a second place 57 slightly inwardly thereof in order to secure the socket tube and internal sleeve together. The sleeve stop is located slightly spaced from the adjacent surface of the socket shoulder 44 when the spring is in relaxed condition.

By the construction just described, a limited axial movement of the tip 30 and included optical fiber is made possible with resiliency provided by the spring 38.

Figure 3:
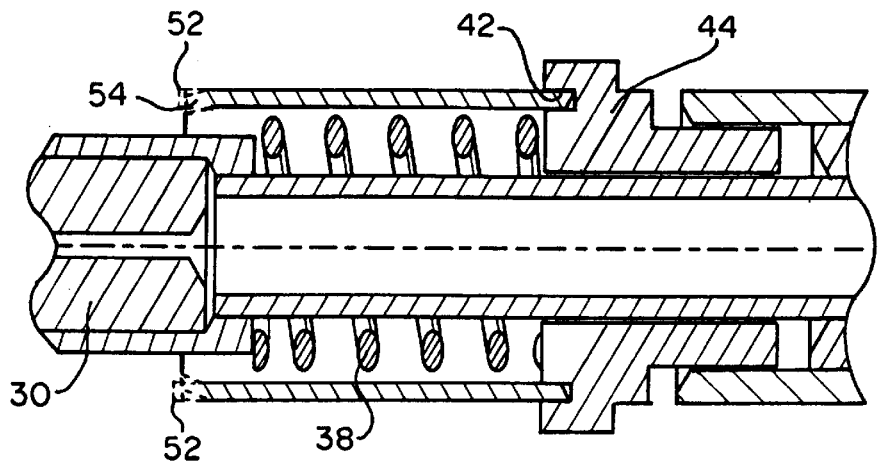
FIG. 3 is a side elevational, partially sectional view of an alternative form of spring shroud.

The spring shroud 40 as initially described has a squared off end 52 (FIG. 3). Alternatively, the outer end 54 can be formed into a slight convexly outwardly facing curve. This curved end 54 will pass more easily through an O-ring seal 56, for example, with less possibility of damaging the seal than would the squared-off end 52.

Figure 4:
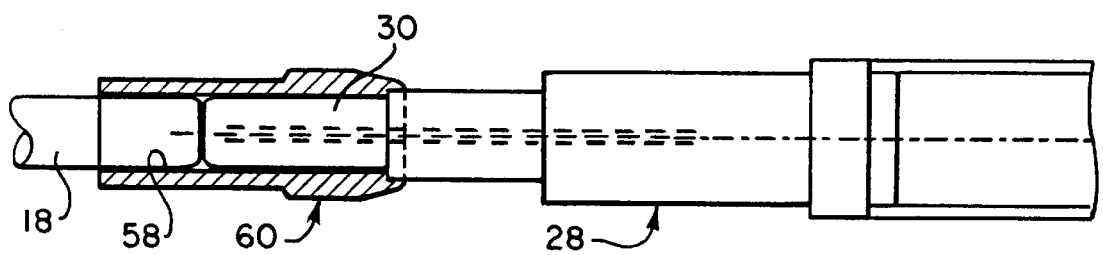
FIG. 4 is an elevational, partially sectional view showing pin and socket termini mated together to position their respective optical fibers within an alignment bushing.
Figure 5:
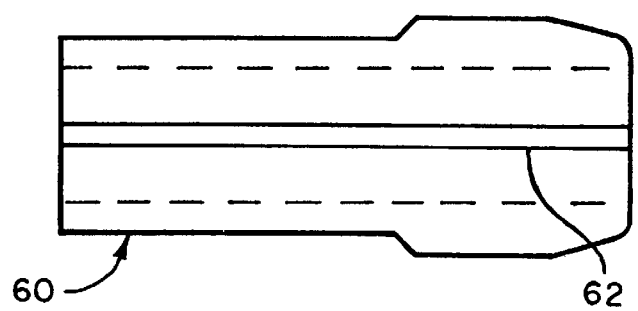
FIG. 5 is an elevational view of an alignment bushing showing a spring-relief slotted opening.

Turning now to FIG. 4, there is shown the mating of a pin terminus 10 with a socket terminus 28. More particularly, the two termini have their respective fiber tips 18 and 30 received in opposite ends of the bore 58 of a generally cylindrical alignment bushing 60, and the facing fiber tip ends are advanced toward each other until contact or appropriate spacing is made, as the case may be. On contact, the outer ends of the optical fibers are held in slightly spaced or P.C. condition as well as in precisely aligned relationship. As can be seen best in FIG. 5, the bushing 60 includes an elongated slotted opening 62 which serves to exert a transverse resilient retaining force on both fiber tips, and because the bushing wall is thicker adjacent the socket terminus entrance, the transverse pressure on the socket fiber tip 30 is greater than than on the pin fiber tip 18. This latter aspect causes the socket fiber tip 30 to be retained in the bushing when the pin and socket termini are pulled apart.

Although the invention has been described in connection with a preferred embodiment it is to be understood that those skilled in the appertaining art can make modifications within the spirit of the disclosed invention and within the ambit of the appended claims.

What is claimed is:

1. Connector apparatus for mating first and second optical fibers to pass an optical signal between the said fibers, comprising:

first and second tips each having an elongated opening dimensioned to slidingly receive an end portion of an optical fiber therein, respectively;

pin means holding a first end portion of the first tip with a second end portion thereof extending outwardly away from said pin means;

socket means holding a first end portion of the second tip and a second end portion thereof extending outwardly away from said socket means; and an alignment bushing having a straight-line bore extending therethrough receiving said socket and pin second end portions in respectively opposite ends of the bushing bore;

said socket means including a tip holder within an end of which the ceramic tip is secured, another end of the tip holder being secured to one end of a hollow socket tube, a coil spring being received onto the socket tube with one end of said spring contacting the tip holder, a socket shoulder having an opening of dimensions enabling sliding receipt onto the socket tube, said socket shoulder contacting another end of the coil spring, a hollow tubular shroud having one end cantilever mounted to the socket shoulder and extending protectively over the coil spring, and a hollow cylindrical stop secured onto the socket tube in slightly spaced relation from the socket shoulder.

2. Connector apparatus as in claim 1, in which the shroud one end is received within a slotted opening formed in an outer surface of the socket shoulder and secured therein by a weldment.

3. Connector apparatus as in claim 1, in which the stop is welded to the socket tube.

4. Connector apparatus as in claim 1, in which the shroud has a free end which is tapered to form a radially outwardly convexly curved end surface.

5. Connector apparatus as in claim 1, in which the tips are made of metal.

6. Connector apparatus as in claim 1, in which the tips are made of ceramic.

7. Connector apparatus as in claim 6, in which the tips are constructed of a ceramic selected from the list consisting of zirconia and AlO$_2$.

8. In connector apparatus for mating a pair of optical fibers for passing an optical signal therebetween, the improvement comprising:

a socket terminus including, a cylindrical ceramic tip having an axial opening extending therethrough, a hollow cylindrical tip holder clamped onto an end portion of the ceramic tip, a hollow metal socket tube having one end thereof received within the tip holder and secured thereto by a weldment, a compression spring received about said socket tube and having a first compressible end contacting the tip holder, a socket shoulder having an opening therethrough within which the socket tube is slidingly received, said shoulder having a surface contacting a second compressible spring end, a tubular shroud having one end secured to the socket shoulder by a weldment and extending spaced about the spring, and a tubular stop secured onto the socket tube serving as a limit stop for movement of the socket shoulder along said socket tube.

* * * * *